United States Patent [19]

Smollin

[11] 4,130,886
[45] Dec. 19, 1978

[54] CIRCUIT FOR REARRANGING WORD BITS
[75] Inventor: Charles F. Smollin, New York, N.Y.
[73] Assignee: RCA Corporation, New York, N.Y.
[21] Appl. No.: 754,692
[22] Filed: Dec. 27, 1976
[51] Int. Cl.² ........................... G06F 7/24; G06F 7/28
[52] U.S. Cl. .................................................. 364/900
[58] Field of Search ... 364/900 MS File, 200 MS File

[56] References Cited
U.S. PATENT DOCUMENTS

| | | | |
|---|---|---|---|
| 3,374,463 | 3/1969 | Muir | 364/900 |
| 3,436,737 | 4/1969 | Iverson | 364/900 |
| 3,839,705 | 10/1974 | Davis | 364/200 |
| 3,887,799 | 6/1975 | Lindgren | 364/900 |
| 3,911,405 | 10/1975 | Sipple | 364/200 |
| 3,953,833 | 4/1976 | Shapiro | 364/200 |

*Primary Examiner*—James D. Thomas
*Attorney, Agent, or Firm*—H. Christoffersen; Samuel Cohen; Henry H. Gage

[57] ABSTRACT

Circuit includes device coupled to receive a word at its input terminals from an address bus and to gate a rearranged word from its output terminals to a data bus of a controller or processor. The word gated to the data bus has its bits interchanged by coupling each of the input terminals of the device to the output terminals corresponding to the new position of the bit in the rearranged word. The word on the address bus is distinguished from an address by specially coding the high-order lines of the address bus when the lower-order lines represent the word.

2 Claims, 2 Drawing Figures

CIRCUIT FOR REARRANGING WORD BITS

This invention relates to logic circuits for rearranging bits in controller or processor words.

Bit manipulation in computer programs is often desirable, but small machines — especially microprocessors — do not provide bit manipulation instructions because, inter alia, the instruction repertoire is limited and the necessary hardware is not provided. When a program requires the rearranging of bits in the data word, several instructions, sometimes grouped into a subroutine, which may include such basic data handling operations as shift, logical AND, and logical OR, arrange the bits in the desired order. When a large number of bit interchanges are required by a program, its execution speed is considerably reduced because of the time required for performing the bit manipulation subroutines.

An example of a program requiring bit manipulations is a Fast Fourier Transform (FFT) using the Cooley-Turkey algorithm. In performing the FFT, either the input samples or the output data points must be rearranged. The ordering of output points or input samples, which results from factoring the exponential matrix and rearranging rows and columns of the resulting factored matrices, is well explained in the literature. A technique for determining the rearrangement required is first to write the index of the sample points or output data points in zero-indexed binary form. Next, the bits of the resulting binary numbers are reversed in order and used to select the data points from memory. There is no convenient polynomial expression that can be derived to perform the index transformation, but interchanging indices by reversing the index bits is difficult and time consuming without bit manipulation instructions.

Table look-up routines are sometimes used for bit transformation. Essentially, a table look-up routine reserves $2^n$ memory locations (for n-bit words) which are accessed using an address comprised of the word to be rearranged for the low order bits with high order bits designating the first address of the reserved area or table. The word stored at a particular location has the bits of the addressing words arranged in the desired order. The memory can be the random-access memory used as the main memory in a system or ROM's (Read Only Memories) used as ancillary memories. For 8-bit words, however, 256 locations must be reserved. If alternative rearrangements must be provided for, then 256 locations of memory must be dedicated to each arrangement pattern. The use of such a large number of memory locations reduces the memory available for programming and thus is not often feasible for small or medium-size processors.

In a system embodying the invention, there is a data bus for conducting data signals and an address bus for conducting address signals. The address bus is partitioned into first and second groups of lines, where the first group carries a number of signals not greater than the number of signals on the data bus, and the second group of lines conduct the remaining address signals. A decoding means is coupled to a second group of address lines to produce a control signal when the second group of lines is carrying a certain combination of signals. A switching means with input ports and output ports is provided for selectively coupling the input ports to the output ports, and each line of the first group of lines is coupled to a different one of the input ports. The output ports of the switching means are coupled to a plurality of gates which couple the output ports to the data bus in response to the control signal from the decoding means.

Figure 1:
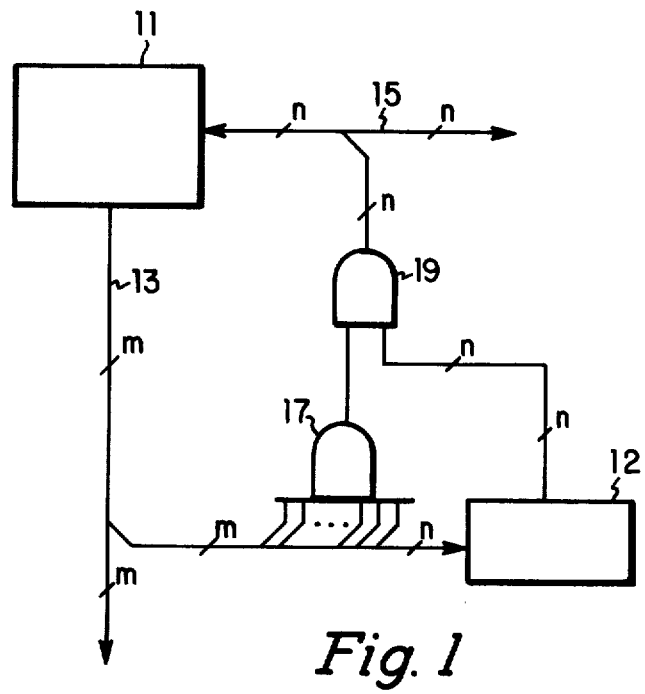
FIG. 1 is a logic diagram of a system embodying the invention.

In FIG. 1, a processor or controller 11 has an associated address bus 13 for carrying address signals to peripheral devices or memories, and an associated data bus 15, which is usually bi-directional, for transmitting and receiving data from the peripheral devices or the memories. Illustratively, there are m lines in the address bus 13 and n lines in the data bus 15, with m > n in most systems. A common value for m is sixteen and for n, eight.

The operation of the system according to the invention is as follows. The processor supplies on the address bus 13 an address which is composed of the data word which is to have the bits interchanged concatenated with bits that address a location to which no other device responds. That is, the processor 11 can address $2^m$ words or locations with m bits, but most systems do not have a full complement of memory so there are many address locations that are not utilized, even though addressable by the m bit address. An AND gate 17 with (m-n) input terminals is used to decode the address bits which do not form part of the data word to be interchanged. The remaining n address lines, which carry the bits of the data word to be interchanged, are coupled to the input side of a switching device 12. A group of n lines from the output side of the switching device 12 couple the interchanged bits to a network of n two-input AND gates 19, the output signals from which are coupled to the data bus 15. Each of the n lines primes one input of each AND gate in the network of AND gates 19. The AND gate network 19 is enabled by the output signal from the AND gate 17, which is coupled to the remaining inputs of all the AND gates. In effect, the processor 11 addresses a non-existent memory location and receives on the data bus 15 a data word which corresponds to the data word, forming part of the address but having the bits interchanged in the desired pattern.

Figure 2:
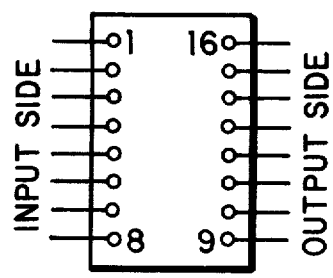
FIG. 2 is a diagram of a suitable switching device.

The switching device 12 can be implemented in several ways; the example used here for illustrative purposes is merely a dual in-line pin socket, such as shown diagramatically in FIG. 2. The socket illustrated has sixteen input points, arranged eight to a side, into which the pins of integrated circuit packages or similar devices can be inserted. The customary pin numbering system begins at an index point taken as 1 and continues down the side in sequence until the end is reached; it then continues on the opposite side in the opposite direction. Pins 1, 8, 9 and 16 are numbered for purposes of clarity. Using socket input points 1 through 8 as the input side, the output side can be taken as points 9 through 16. Wire jumpers can then be connected between the points of the socket in the pattern desired. Alternatively, a DIP plug with the connections fixed in the desired pattern can be inserted in the socket. It is also anticipated that electrically controlled devices, such as transmission gates, can also be used with the bit pattern being controlled from the processor. Switching devices such as wafer switches can be used to set manually the pattern desired.

As an example of a pattern in the FFT application, pin 1 is wired to pin 9, pin 2 to pin 10, and so on until pin 8 is coupled to pin 16. That is, if p represents the input pin number, p + 8 is the output pin number.

If the rearrangement pattern is to be fixed, the switching device 12 can be implemented by conductor, e.g., wire or printed circuit, connections only.

For purposes of illustration, it will be assumed that the processor 11 in FIG. 1 is a COSMAC CDP1802 microprocessor (RCA Corporation). The COSMAC microprocessor includes a sixteen register array, each register storing 16 bits. One of the registers is selected as a memory address register. An example of an instruction using one of these registers as a memory reference is the "LOAD VIA N" instruction, having the mnemonic LDN and the operation code 0N. The value of N is taken as 0 through F, i.e., a hexadecimal digit. (Hexadecimal digits comprise the numerals 0 through 9 and the letters A through F, the letters representing decimal quantities 10 through 15.) Execution of the LDN instruction causes the contents of the register designated by N to be gated to the address bus 13 and the data word so addressed to be loaded into a D-register, this register being the equivalent of an accumulator and being located within the processor.

The contents of the registers in the array can be manipulated by such instructions as PUT LOW REG N (PLO) (AN) or GET LOW REG N (PLO) (8N) which, respectively, put the contents of the D-register into the lower eight bit positions of the register designated by N, or retrieves from the low order eight bits of the register N the byte (8 bits) to be put into the D-register. Assuming that only half the addressable memory is used with the system, and further assuming that register 9 (N=9) is to be used for the bit interchange process and has FF stored in the high order byte, the sequence of instructions that would rearrange the bits of a word in the D-register would be as follows:

| MNEMONIC | HEX CODE | BINARY CODE |
|---|---|---|
| PLO 9 | A9 | 1010 1001 |
| LDN 9 | 09 | 0000 1001 |

In FIG. 1, when the first instruction PLO9, is executed, the contents of the D-register are placed in low order position in the register 9. When LDN 9 instruction is executed, the AND gate 17, which is wired to respond to an input signal of all logical ones (FF), produces an output signal which enables eight AND gates in the AND gate network 19. The low order eight bits, representing the word to have the bits interchanged, are coupled to the input side of the switching device 12 and appear at the output side according to the pattern of jumper wires. They are gated onto the data bus 15 from the AND gates 19 and are stored in the D-register (within processor 11) by the LDN instruction. Thus, after setting up the high order byte of the register, only two instructions are required to interchange the bits of a data word according to a prescribed bit pattern.

Similar circuits can be used if alternative rearrangement patterns are required. The decoding AND gate 17 of each such circuit, however, must be responsive to a different combination of the (m-n) address signals coupled to its input.

What is claimed is:

1. In a data processing system for rearranging bits of a word according to a pattern, wherein the system includes: data bus means for conducting data signals of a word to an accumulator register; and address bus means for receiving address signals read from an addressable register;

the improvement comprising:
the address bus means being partitioned into a first group of lines for conducting, respectively, (a) a part of the address signals not greater in number than the number of data lines which comprise the data bus means and (b) a second group of lines for conducting the remaining signals of the address signals;
means for storing in the addressable register (a) the bits of the word whose bits are to be rearranged at certain addressable register positions for application to the first group of address means lines and (b) additional bits comprising a special code at other addressable register bit positions for application to the second group of address means lines;
decoding means coupled to the second group of address means lines responsive to the special code for supplying a control signal;
a plurality of gates enabled by the control signal, each gate having an input and an output, with each gate output being coupled to a respective line of said data bus means; and
coupling means for coupling the first group of address means lines in the rearrangement pattern to respective ones of the gate inputs.

2. The invention as claimed in claim 1 wherein said coupling means includes
switching means having input port means coupled to said first group of lines means and output port means coupled to the input means of said gating means for selectively coupling said input ports to said output ports.

* * * * *